(12) United States Patent
Akehi et al.

(10) Patent No.: US 7,121,626 B2
(45) Date of Patent: Oct. 17, 2006

(54) HEADREST LOCK STRUCTURE WITH LOCK SLOTS, METHOD FOR FORMING LOCK SLOTS IN HEADREST POLE AND METHOD FOR PRODUCING HEADREST POLE

(75) Inventors: Yoso Akehi, Hiroshima (JP); Hiroyuki Ishikawa, Fuchu-cho (JP); Ryoji Matsukawa, Hiroshima (JP)

(73) Assignee: Delta Kogyo Co., Ltd., (JP)

( * ) Notice: Subject to any disclaimer, the term of this patent is extended or adjusted under 35 U.S.C. 154(b) by 17 days.

(21) Appl. No.: 10/963,016

(22) Filed: Oct. 12, 2004

(65) Prior Publication Data

US 2005/0082893 A1    Apr. 21, 2005

(30) Foreign Application Priority Data

Oct. 17, 2003  (JP)  ............................. 2003-357497
Jun. 30, 2004  (JP)  ............................. 2004-193560

(51) Int. Cl.
*B60R 22/28*    (2006.01)

(52) U.S. Cl. ...................................... 297/410

(58) Field of Classification Search ............... 297/410; 248/118, 159, 407, 408; 403/109.5
See application file for complete search history.

(56) References Cited

U.S. PATENT DOCUMENTS 3,498,672 A   3/1970  Leichtl 5,934,755 A   8/1999  Halamish
6,454,356 B1*  9/2002  Yamada ...................... 297/410

FOREIGN PATENT DOCUMENTS

| DE | 33 14 443 A1 | 10/1984 |
| EP | 0 798 157 A2 | 10/1997 |
| JP | 2003-009992 | 1/2003 |
| WO | WO 03/064205 A1 | 8/2003 |
| WO | WO 2003064205 A1 * | 8/2003 |

* cited by examiner

*Primary Examiner*—Peter M. Cuomo
*Assistant Examiner*—Tania Abraham
(74) *Attorney, Agent, or Firm*—Gerald E. Hespos; Anthony J. Casella

(57) ABSTRACT

A headrest lock structure has a plurality of lock slots formed in a line along the axial direction of a cross-sectionally circular headrest pole and a lock plate is adapted to fit into one of the lock slots. Each lock slot has a bottom surface protruding in an arc within a region concaved from the outer peripheral surface of the headrest pole by a given distance, and a side surface formed on at least one of the sides of the bottom surface in the axial direction of the headrest pole to extend at approximately a right angle with the bottom surface. The lock plate has an arc-shaped concave portion corresponding to the profile of the bottom surface of each lock slot, and a flat portion corresponding to the side surface of each lock slot. The headrest lock structure can reliably prevent unintentional release of headrest lock.

16 Claims, 9 Drawing Sheets

FIG.1A
FIG.1B
FIG.1C
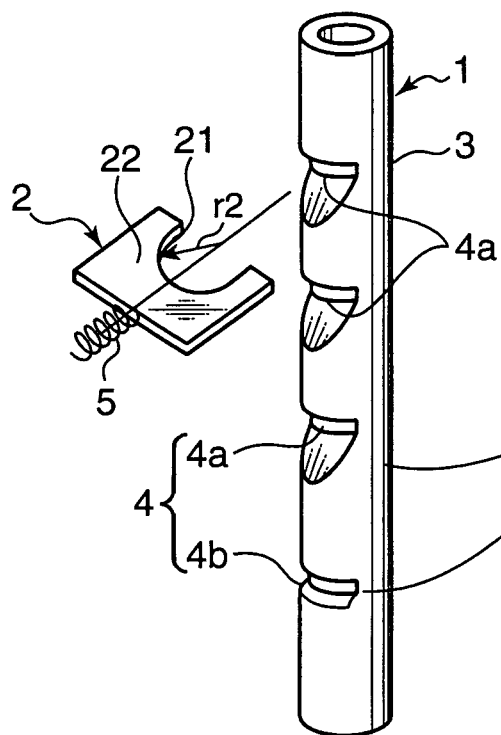
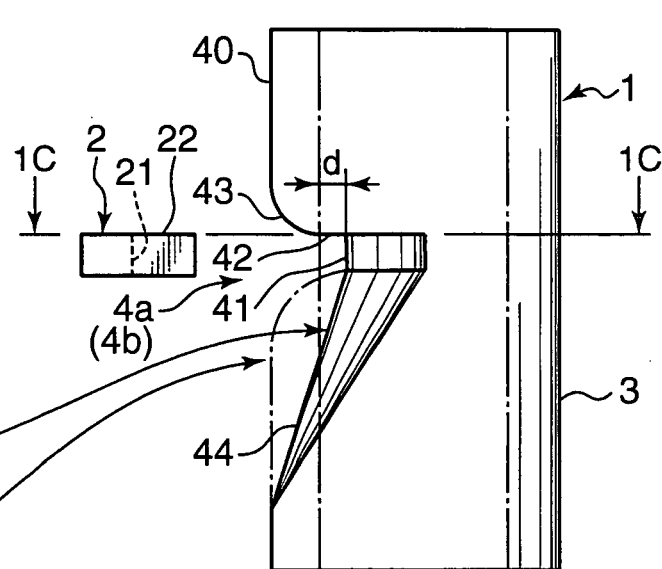
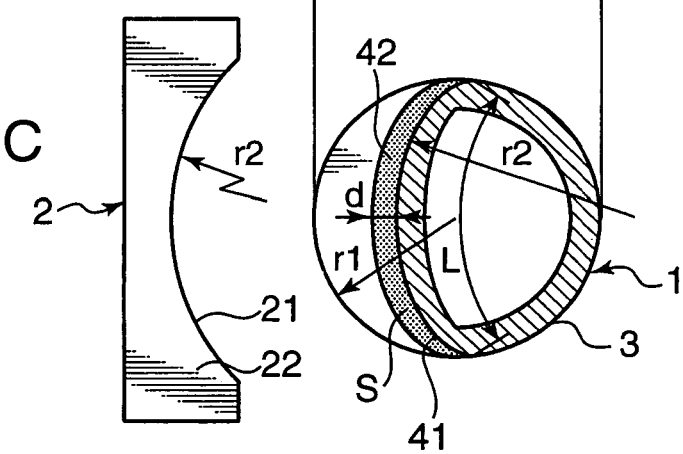

HEADREST LOCK STRUCTURE WITH LOCK SLOTS, METHOD FOR FORMING LOCK SLOTS IN HEADREST POLE AND METHOD FOR PRODUCING HEADREST POLE

BACKGROUND OF THE INVENTION

1. Field of the Invention

The present invention relates to a headrest lock structure with lock slots, a method for forming lock slots in a headrest pole and a method of producing a headrest pole.

2. Description of the Related Art

FIGS. 8A and 8B schematically show the structure of a conventional automobile seat, wherein FIG. 8A is a perspective view generally showing the external appearance of the seat, and FIG. 8B is a perspective view showing a headrest of the seat.

As shown in FIG. 8A, the conventional automobile seat comprises a seat cushion 501 to be mounted on an automobile body, a seat back 502 attached to the seat cushion 501 in such a manner that it can be selectively reclined forwardly or backwardly relative to the seat cushion 501, and a headrest 503 attached to the top end of the seat back 502 in a vertically movable manner. As shown in FIG. 8B, the headrest 503 includes a cushion member 504 and a reverse U-shaped headrest pole 505 supporting the cushion member 504. The right and left legs 506, 507 of the headrest pole 505 are detachably inserted into a pair of corresponding pole guides 508 provided in the seat back 502.

The left leg 506 of the headrest 503 has an outer peripheral surface formed with a plurality of lock slots 509 which are arranged in a line along the axial direction of the left leg 506, and the pole guide 508 corresponding to the left leg 506 is provided with a lock plate 516 (see FIG. 9) adapted to be releasably fitted into either one of the lock slots 509. According to the above lock structure, the lock plate 516 of the pole guide 506 can be fitted into one of the lock slots 509 formed in the left leg 506 of the headrest pole 505 to hold the headrest 503 at a desired height.

FIGS. 9A to 9D show a conventional headrest lock structure, wherein FIG. 9A is an explanatory cross-sectional view of a production method for the headrest pole, FIG. 9B being a vertical-sectional view of the headrest pole which is engaged with the lock plate in its correct position, FIG. 9C being a cross-sectional view of the headrest pole and the lock plate in FIG. 9B, and FIG. 9D being a cross-sectional view of the headrest pole and the lock plate in the state after the headrest pole is rotated relative to the lock plate from the position in FIG. 9C.

Heretofore, a solid round bar has been used as a material of the headrest pole 505 and subjected to a cutting process to form lock slots 509 therein. Late years, in view of a relatively high production cost in the above technique, a pipe having a circular cross-section has been increasingly used as a material of the headrest pole 505 and subjected to a press-forming process using a punch 511 to form the lock slots 509 therein, as shown in FIG. 9A (see, for example, Japanese Patent Laid-Open Publication No. 15-009992).

The punch 511 for use in the above method has a front end 511a with a flat shape, and thereby each of the lock slots 509 is formed to have a flat bottom surface 512 and an upper side surface 513 extending outwardly from the bottom surface 512 at an approximately right angle therewith, as shown in FIG. 9B. In this figure, the reference numeral 514 indicates an arc-shaped portion (sagging portion) 514 connected to the upper side surface 513, and the reference numeral 515 indicated an inclined portion formed to have a given oblique angle relative to the bottom surface 512. Each of the lock slots 509 other than the lowermost lock slot has a vertically asymmetrical shape with the inclined portion 515, and only the lowermost lock slot 509 has a vertically symmetrical shape without the inclined portion 515 (as indicated by the two-dot chain line in FIG. 9B). The lock plate 516 is formed in a flat plate shape in which a lock portion to be brought into contact with the bottom surface 512 of each of the lock slots 509 has rectangular corners. The upper side surface 513 has an arch shape in top plan view (as indicated by the hatching in FIGS. 9A, 9C and 9D) defined between the arc-shaped portion 514 and the flat bottom surface 512, and the width of the upper side surface 513 has large changes ranging from a maximum width d1 to a minimum width 0 (zero).

Thus, if the headrest pole 505 is attached to the pole guides 508 in its given correct position, the lock plate 516 will be brought into contact with a portion of the upper side surface 513 having the maximum width d1 in one of the lock slots 509, so that an engagement region S1 between the upper side surface 513 and the lock plate 516 can have a desired area determined by the maximum width d1 and a maximum length L1 of the upper side surface 513, as shown in FIG. 9C.

While the method as disclosed in the above Patent Publication 1 can produce the headrest pole 505 through a simplified operation as compared with the conventional technique to achieve an extremely low-cost structure, a bending process of the headrest pole 505 to be performed after the formation of the lock slots 509 is liable to cause an angular error in the headrest pole 505. Further, the lock plate 516 includes production errors.

Due to the angular error of the headrest pole 505 caused by the bending process and the production errors of the lock plate 516, the headrest pole 505 is likely to be attached in a displaced or mismatch position where the headrest pole 505 is rotated from its given correct position. Moreover, an impact force is likely to be applied to the headrest pole 505 in a direction causing the rotation thereof (as indicated by the arrow "a" in FIG. 9D). In these cases, as shown in FIG. 9D, the lock plate 516 is brought into contact with the outward end portion 517 of the upper side surface 513 of one of the lock slots 509, or a portion of the upper surface 513 having a width less than the maximum width d1, so that an engagement region S2 between the upper surface 513 and the lock plate 516 has a width d2 which is reduced to about one-half of the maximum width d1 and a length L2 which is reduced as compared with the maximum length L1. Consequently, the area of the engagement region S2 is significantly reduced, and the headrest lock becomes liable to be unintentionally released. While the angular error caused by the bending process can be suppressed by performing the bending process before the press-forming process of the lock slots 509, the press-forming process performed after the bending process inevitably involves a time-consuming operation due to the obstructive curved portion of a pipe 510, resulting in difficulties in achieving a simplified production process.

SUMMARY OF THE INVENTION

In view of the above circumstances, it is therefore an object of the present invention to provide a headrest lock structure with lock slots, a method of forming such lock slots in a headrest pole, and a method of producing such a headrest pole which are free from the problems residing in the prior art.

According to an aspect of the invention, a headrest lock structure is provided with a plurality of lock slots formed in a cross-sectionally circular headrest pole in a line along the axial direction of the headrest pole, and a lock member adapted to be fitted into either one of the lock slots. Each of the lock slots has a bottom surface protruding in an arc shape within a region concaved from the outer peripheral surface of the headrest pole by a given distance; and a side surface formed on at least one of the sides of the bottom surface in the axial direction of the headrest pole to extend outwardly from the bottom surface within the region at an approximately right angle with the bottom surface.

The plurality of lock slots may be formed in a material pole by pressing a peripheral surface of the material pole with a press assembly having a plurality of arc-shaped concave portions corresponding to the respective bottom surfaces of the lock slots and a plurality of flat portions corresponding to the respective side surfaces of the lock slots. The pole formed with the slots may be bent to produce a headrest having a given shape.

Other features and advantages of the present invention will be apparent from the accompanying drawings and from the detailed description.

BRIEF DESCRIPTION OF THE DRAWINGS

FIGS. 1A to 1C illustrate a headrest lock structure according to an embodiment of the present invention, FIG. 1A being a perspective view showing the external appearance of the headrest lock structure, FIG. 1B being a front view showing a lock slot portion of the headrest lock structure, and FIG. 1C being a sectional view taken along the line 1C—1C in FIG. 1B.

DETAILED DESCRIPTION OF THE PREFERRED EMBODIMENTS

Figure 2:
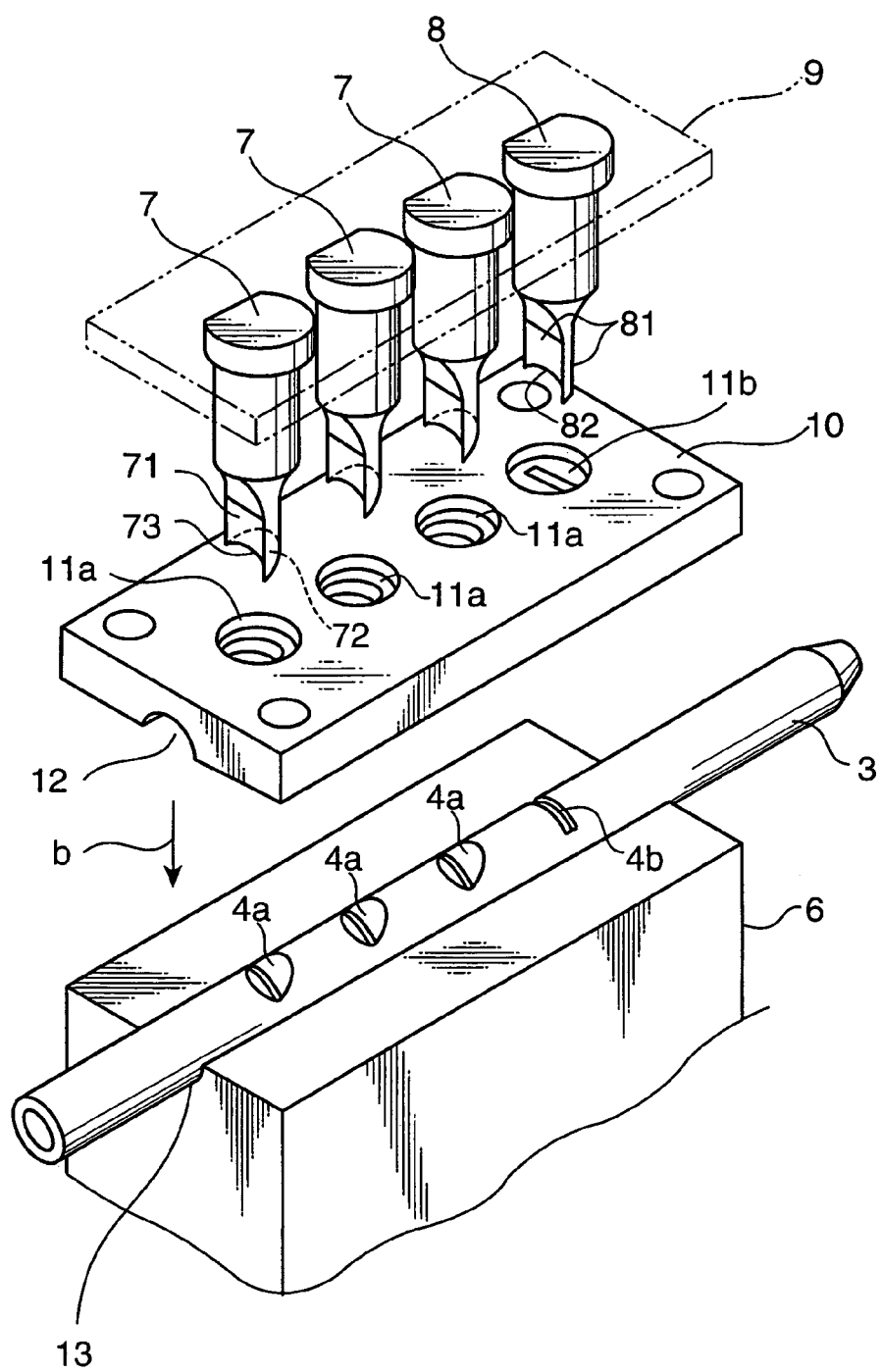
FIG. 2 is an explanatory perspective view showing forming lock slots in a headrest pole.

FIGS. 1A to 1C illustrate a headrest lock structure according to one embodiment of the present invention, wherein FIG. 1A is a perspective view showing the external appearance of the headrest lock structure, FIG. 1B being a front view showing a lock slot portion of the headrest lock structure, and FIG. 1C being a sectional view taken along the line 1C—1C in FIG. 1B.

The headrest lock structure according to this embodiment is incorporated, for example, in a seat back of an automobile seat. As shown in FIGS. 1A to 1C, the headrest lock structure comprises a headrest pole 1 and a lock plate or lock member 2 as primary components.

For example, a long, cross-sectionally circular pipe member 3 made of stainless steel or iron is used as a material pole. The pipe member 3 is subjected to a press-forming process to form a plurality (four in this embodiment) of lock slots 4 therein in a line along the axial direction of the pipe member 3. The cross-sectional shape of the pipe member (or an after-mentioned solid member 30) is not limited to a circular shape, but may be any other suitable shape, such as a square or rectangular shape.

Among the lock slots 4, the lower most lock slot 4b has a shape different from that of the upper three lock slots 4a, because while each of the lock slots 4a has a shape allowing the height of a headrest to be freely adjusted depending on the body type of an occupant or other factor, the lock slot 4b is required to have a shape for preventing a headrest from unintentionally coming off. This reason will be described in more detail later.

Each of the lock slots 4a has a vertically asymmetrical shape defined by a bottom surface 41 protruding in an arc shape within a region concaved from the outer peripheral surface 40 of the pipe member 3 by a given distance, an upper side surface 42 formed at an approximately right angle with the bottom surface 41, an arc-shaped portion (sagging portion) 43 extending from the upper side surface 42 to the outer peripheral surface 40, and an inclined portion 44 extending from the bottom surface 41 to the outer peripheral surface 40 at a given oblique angle. The above given distance includes the width of the arc-shaped portion 43 caused by the press-forming process for each of the lock slots 4a, in addition to the width "d" of the upper side surface 42 in the radial direction of the pipe member. Each of the lock slots 4a is formed to extend over approximately one-half of the entire circumference of the pipe member 3, and the bottom surface 41 thereof has a curvature radius r2 greater than the curvature radius r1 of the outer peripheral surface 40 of the pipe member 3. The upper side surface 42 is formed as an arc-shaped zone in top plan view, which is defined between the arc-shaped portion 43 and the arc-shaped bottom surface 41 to extend while keeping the width "d" at an approximately constant value.

The lock slot 4b has a vertically symmetrical shape defined by a bottom surface 41 protruding in an arc shape within a region concaved from the outer peripheral surface 40 of the pipe member 3 by a given distance, upper and lower side surfaces 42, 42 each formed at an approximately right angle with the bottom surface 41, and two arc-shaped portions 43, 43 extending from the upper and lower side surfaces 42, 42 to the outer peripheral surface 40, respectively. The lock slots 4b is also formed to extend over approximately one-half of the entire circumference of the pipe member 3, and the bottom surface 41 thereof has a curvature radius r2 greater than the curvature radius r1 of the outer peripheral surface 40 of the pipe member 3. The upper side surface 42 is formed as an arc-shaped zone in top plan view, which is defined between the corresponding arc-shaped portion 43 and the arc-shaped bottom surface 41 to extend while keeping the width "d" at an approximately constant value.

The lock plate 2 is prepared by subjecting a metal plate with a thickness capable of being fitted into each of the lock slots 4 to a die-cutting process. Specifically, the lock plate 2 to be fitted into either one of the lock slots 4 formed in the headrest pole 1 has an arc-shaped concave portion 21 corresponding to the profile of the bottom surface 41 of each of the lock slots 4, and a flat portion 22 corresponding to the upper side surface 42 of each of the lock slots 4. The concave portion 21 has a curvature radius r2 equal to or slightly greater than the curvature radius r2 of the bottom surface 41 of each of the lock slots 4. The concave portion 21 is notched during the die-cutting process of the metal plate. As described later, the lock plate 2a is elastically biased by a coil spring 5 so as to be brought into engagement with one of the lock slots 4.

Figure 3:
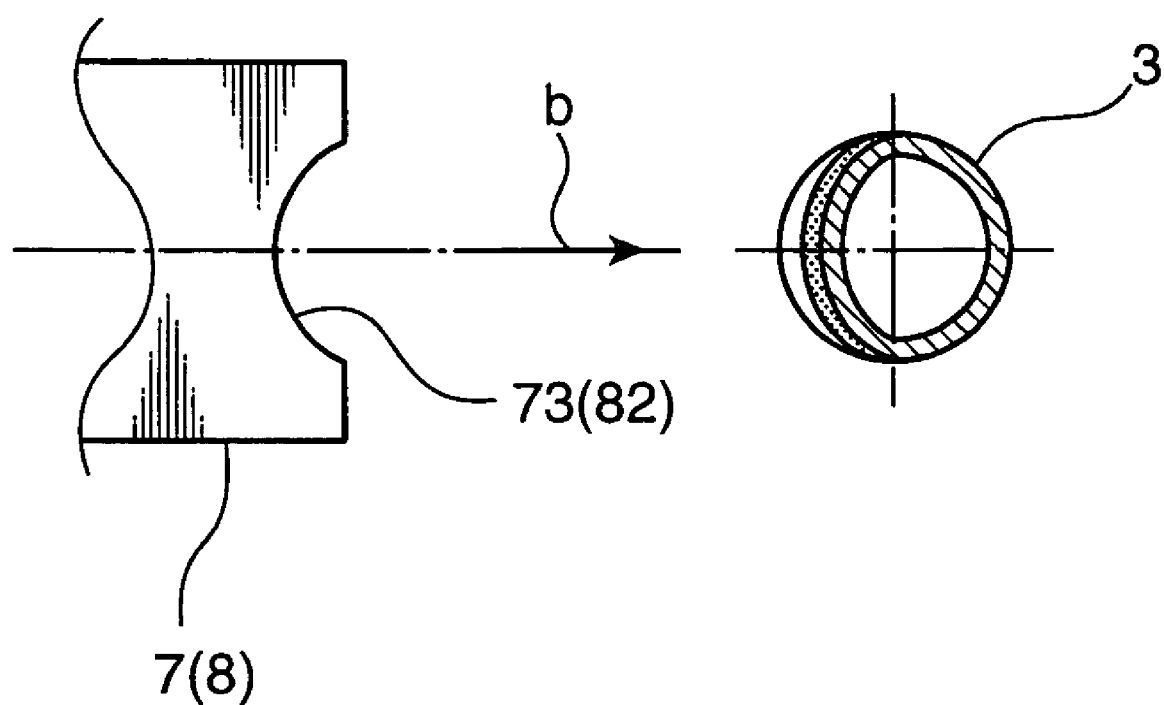
FIG. 3 illustrates the positional relation between a punch and the associated lock slot, viewing from the upper surface of the punch.

For example, the lock slots of the headrest pole in the above headrest lock structure may be formed through the following method. Referring to FIG. 2 showing a manner of forming the lock slots in the headrest pole, and FIG. 3 illustrating the positional relation between a punch and the associated lock slot, viewing from the upper surface of the punch, a pipe member 3 for use as a material pole is first cut to have a given length, and horizontally placed on a press base 6. Then, a punch guide 10 formed with guide holes 11a, 11b for punches 7, 8 (pressing tool) at given positions is placed on the press base 6 to cover over a portion of the outer peripheral surface of the pipe member 3. In FIG. 2, the reference numerals 12 and 13 indicate a pair of semicircular grooves corresponding to the profile of the pipe member 3 to be subjected to a press-forming process. The grooves 12, 13 act to disperse a pressing force applied to the pipe member 3 so as to suppress the deformation in a portion of the pipe member 3 other than portions to be formed as the lock slots 4. In this state, the punches 7, 8 held by a punch holder 9 are moved downwardly (in a direction indicated by the arrow "b") and pressed against the outer peripheral surface of the pipe member 3 to form the lock slots 4 (4a, 4b) in the pipe member 3.

This pressing assembly includes four punches 7, 8. Among these punches, the three punches 7 for forming the lock slots 4a have the same shape, and the punch 8 for forming the lock slot 4b has a shape different from that of the punches 7. Specifically, each of the punches 7 has a flat portion 71 on the upper side thereof (front side in FIG. 2), and an inclined portion 72 on the lower side thereof (back side in FIG. 2). On the other hand, the punch 8 has only a flat portion 81 on each of the upper and lower sides thereof. Further, as shown in FIG. 3, each of the punches 7, 8 commonly has a front end concaved in an arc shape. Thus, the respective shapes of the arc-shaped concave portions 73, 82, the flat portions 71, 81 and the inclined portions 72 are transferred to the pipe member 3 to form the two types of lock slots 4a, 4b. Then, the pipe member 3 with the transferred lock slots 4a, 4b is bent in a U shape in such an manner that the lock slots 4a, 4b are located on the inward side of the U shape, to obtain a finished headrest pole 1.

Figure 4A:
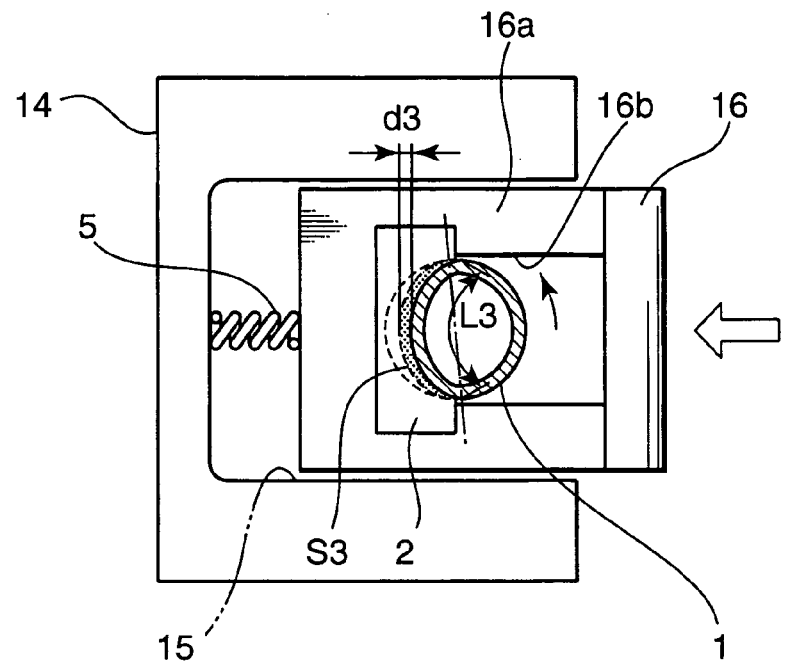
FIGS. 4A and 4B illustrate the structure of a lock plate, FIG. 4A being a cross-sectional view of the lock plate, and FIG. 4B being a vertical-sectional view of the lock plate.
Figure 4B:
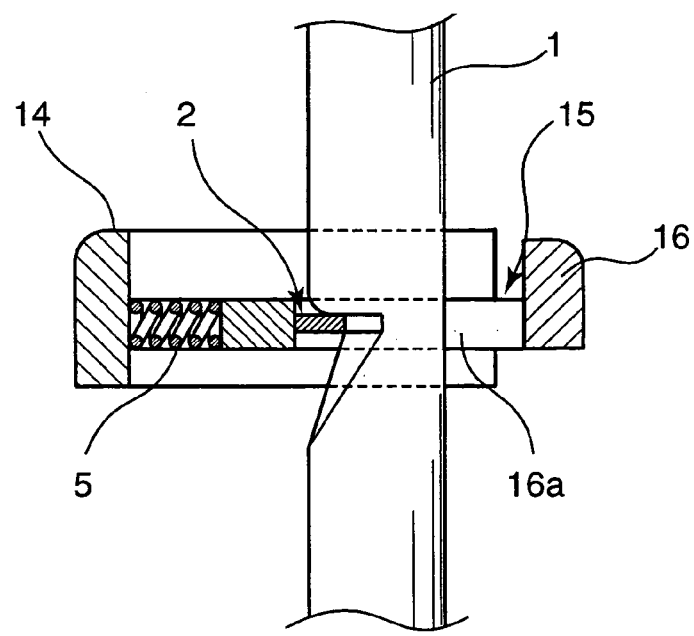

Referring to FIGS. 4A and 4B illustrating the structure of the lock plate, the headrest pole 1 is attached in the state after it is rotated relative to the lock plate 2 by a given angle. The upper portion of a rectangular-parallelepiped-shaped pole guide 14 attached to the top end of a seat back of an automobile seat (not shown) is formed with a hollow space 15 having an opening on the right side in the figures. A lock-releasing knob 16 capable of being manually pushed from the right side toward the left side is slidably fitted into the hollow space 15. A slide portion 16a of the lock-releasing knob 16 is formed with a rectangular opening 16b allowing the headrest pole 1 to be inserted therethrough, and the lock plate 2 is fixed to the left end of the opening 16b. The coil spring 5 is disposed within the hollow space 15 to bias the lock-releasing knob 16 in a direction allowing the slide portion 16a to be pushed out of the hollow space 15.

With reference to FIGS. 1A to 1C and FIGS. 4A and 4B, the operation of the headrest lock structure according to this embodiment will be described below.

The following description will be firstly made in conjunction with a case where it is desired to move the headrest to a higher position from the state when the lock plate 2 is fitted into either one of the lock slots 4a. In this case, when a certain force is applied upwardly to the headrest, the concave portion 21 of the lock plate 2 in contact with the bottom surface 41 of the lock slot 4a is slidingly moved along the inclined portion 44 against the biasing force of the coil spring 5. Thus, when the headrest is left untouched after manually moved upward to a desired height, the lock plate 2 is fitted into another one of the lock slots 4a (or the lock slot 4b), and the headrest is held at a position corresponding to the lock slot.

During this operation, if the headrest pole 1 is attached to the pole guide 14 in its given correct position, the flat portion 22 of the lock plate 2 is brought into the flat upper side surface 42 of the lock slot 4 to provide an arc-shaped engagement region S between the upper side surface 42 and the flat portion 22, which has an increased maximum length L. Thus, even if the engagement region S has a maximum width "d" equal to the maximum width "d1" in the conventional lock structure, it is understood that the area of the engagement region S becomes larger than that in the conventional lock structure. Otherwise, even if the headrest pole 1 is attached in a displaced or mismatch position where it is rotated from the given correct position, as shown in FIG. 4A, due to an angular error of the headrest pole 1 caused by a bending process thereof and/or production errors of the lock plate 2, differently from the conventional lock structure, the width d3 and the length L3 of the engagement region S3 of the lock plate 2 to the headrest pole 1 in the lock structure according to this embodiment will not be practically reduced as compared with the maximum width "d" and the maximum length L, respectively. Thus, the area decrease rate of the engagement region S3 (the decrease rate between the areas of the engagement region S3 before and after the rotation) is reduced to prevent the headrest lock from being unintentionally released. Further, even if an impact force is applied to the headrest pole 1 in a direction causing the rotation thereof, the unintentional release of headrest lock can also be prevented.

In a reverse way, even if a certain force is applied downwardly to the headrest in the state when the lock plate 2 is fitted into either one of the lock slots 4a, 4b, the headrest will never be moved downwardly, because the lock plate 2 is in contract with the flat upper side surface 42 formed on the upper side of the lock slot 4a or 4b.

Moreover, even if it is attempted to move the headrest upward in the state when the lock plate 2 is fitted into the lowermost lock slot 4b, the headrest will never be further moved upwardly, because no inclined portion is formed on the lower side of the lock slot 4b, and the flat portion 22 of the lock plate 2 is brought into contact with the flat lower side surface 42 formed on the lower side of the lock slot 4b. This prevents the headrest from unintentionally coming off.

Secondly, the following description will be made in conjunction with a case where it is desired to move the headrest to a lower position from the state when the lock plate 2 is fitted into either one of the lock slots 4a. In this case, when the aforementioned lock-releasing knob 16 is manually pushed, the lock plate 2 is moved together with the lock-releasing knob 16 against the biasing force of the coil spring 5 to release the headrest lock. Then, when the lock-releasing knob 16 is left untouched after the headrest is moved to a desired position, the lock plate 2 is fitted into either one of the lock slots 4a (or the lock slot 4b), and the headrest is held at a position corresponding to the lock slot.

During this operation, if the headrest pole 1 is attached to the pole guide 14 in its given correct position, the flat portion 22 of the lock plate 2 is brought into the flat upper side surface 42 of the lock slot 4a (or lock slot 4b) to provide an arc-shaped engagement region S between the upper side surface 42 and the flat portion 22, which has an increased maximum length L and a constant maximum width "d". Thus, it is understood that the engagement region S has a desired area. Otherwise, even if the headrest pole 1 is attached in its position where it is displaced from the given correct position, as shown in FIG. 4A, due to an angular error of the headrest pole 1 caused by a bending process thereof and/or production errors of the lock plate 2, or due to an impact force applied to the headrest pole 1 in a direction causing the rotation thereof, the width d3 and the length L3 of the engagement region S3 of the lock plate 2 to the headrest pole 1 in the lock structure according to this embodiment will not be practically reduced as compared with the maximum width "d" and the maximum length L, respectively. Thus, the area decrease rate of the engagement region S3 is reduced to prevent the headrest lock from being unintentionally released.

If the headrest is moved upwardly while pushing the lock-releasing knob 16, the headrest can be detached without allowing the lock plate 2 to be fitted into the lowermost lock slot 4b.

As mentioned above, in the headrest lock structure according to this embodiment, each of the lock slots 4 (4a, 4b) has the bottom surface 41 protruding in an arc shape within a region concaved from the outer peripheral surface 40 of the pipe member 3 by a given distance, and the side surface 42 formed on at least one of the sides of the bottom surface 41 in the axial direction of the pipe member 3 to extend at an approximately right angle with the bottom surface 41. Further, the lock plate 2 is formed with the concave portion 21 having an arc shape corresponding to the profile of the bottom surface 41, and a flat portion 22 corresponding to the side surface 42. Thus, the engagement region S between the headrest pole 1 and the lock plate 2 has an arc shape to provide an increased maximum length L thereof, so that the area of the engagement region S of the lock plate 2 to the headrest pole 1 can be reliably maintained at a desired value to prevent the unintentional release of headrest lock while achieving a low-cost structure using the pipe member 3 as a material of the headrest pole 1.

Further, in the production of the headrest pole 1 according to the above embodiment, the lock slots 4 is first formed, and then a bending process is performed to provide a given shape in the headrest pole 1. Thus, while a method of forming the lock slots 4 after the bending process inevitably involves a time-consuming operation due to the obstructive curved portion of the pipe member, this method allows the lock slots 4 to be readily formed without such a time-consuming operation. In addition, the lock slots 4 have a function of preventing the unintentional release of headrest lock, as mentioned above. Thus, even if an angular error is caused by the bending process performed after the formation of the lock slots 4 in the above manner, the unintentional release of headrest lock can be reliably prevented.

Figure 5A:
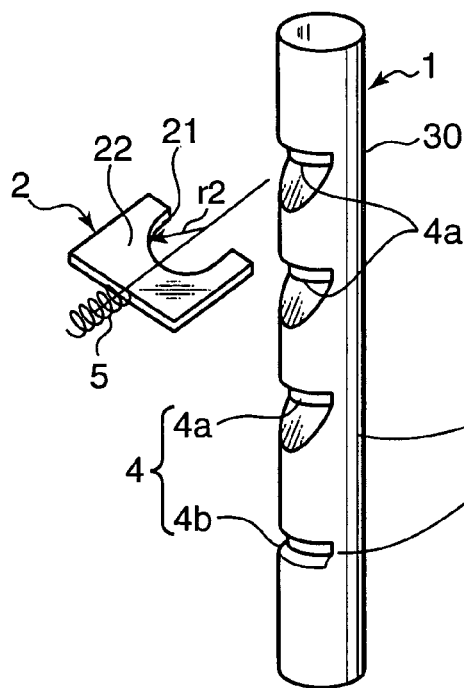
FIGS. 5A to 5C illustrate a headrest lock structure using one modification of a headrest pole, FIG. 5A being a perspective view showing the external appearance of the headrest lock structure, FIG. 5B being a front view showing a lock slot portion of the headrest lock structure, and FIG. 5C being a sectional view taken along the line 5C—5C in FIG. 5B.
Figure 5B:
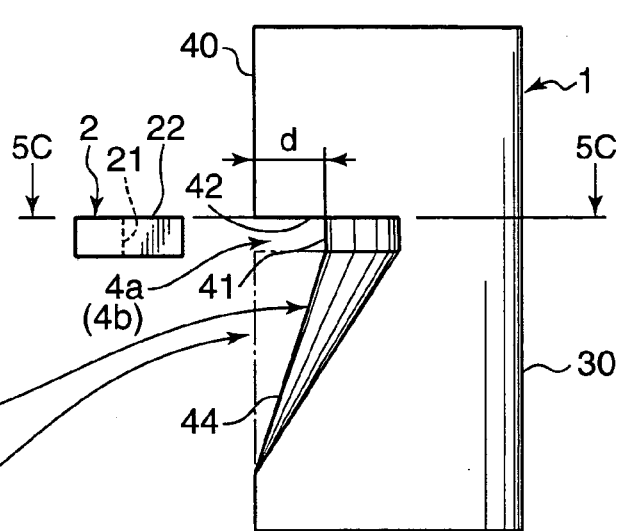
Figure 5C:
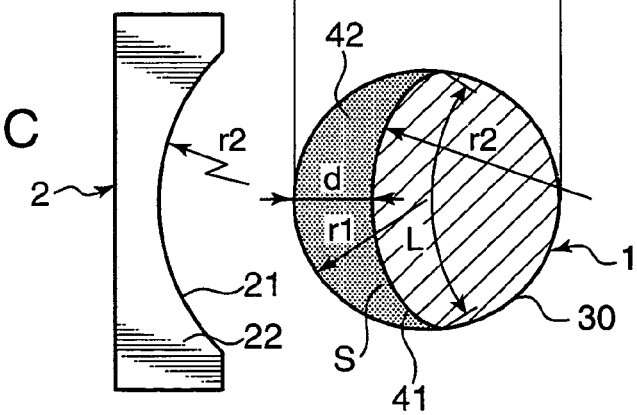

While the headrest pole 1 in the above embodiment is produced using a cross-sectionally circular pipe member 3 as a material pole, a cross-sectionally circular solid member 30 consisting of a metal bar may also be used as a material pole, as shown in FIGS. 5A to 5C. In this case, the solid member may be subjected to a cutting process to form the lock slots 4 therein so as to eliminate the arc-shaped portion (sagging portion) 43 (see FIG. 1) and achieve substantial increase in the maximum width "d" of the upper side surface 42 and the area of the engagement region S to further reliably prevent the unintentional release of headrest lock. Alternatively, the headrest pole 1 may be produced through a forging process, or may be produced by molding a resin material.

Figure 6:
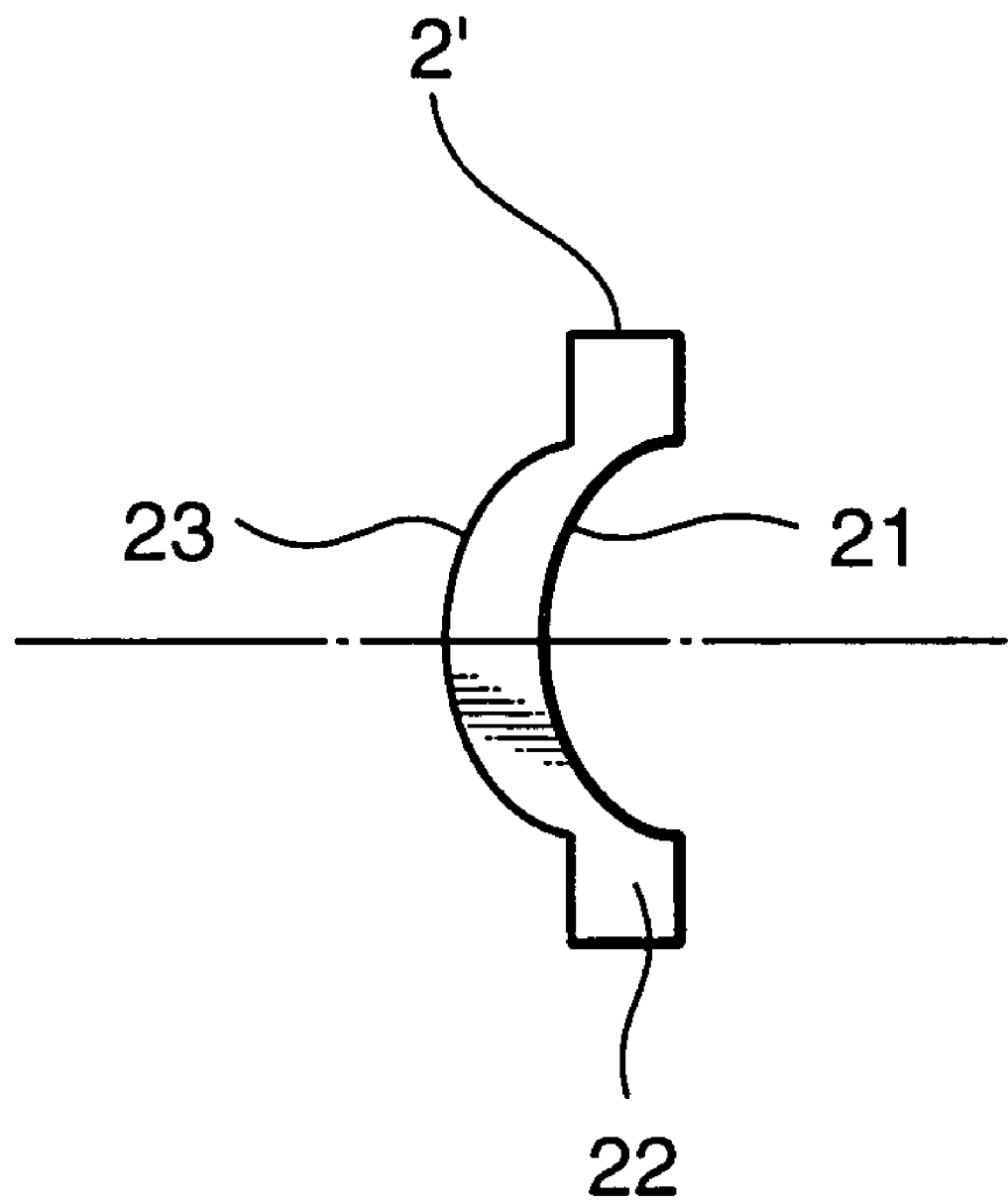
FIG. 6 is a top plan view showing one modification of a lock plate.

While the lock plate 2 in the above embodiment has the arch-shaped concave portion 21 on the side opposed to the lock slots 4 of the headrest pole 1, the opposite side of the concave portion 21 may be formed as a convex portion having an arc shape corresponding to the shape of the concave portion 21 to provide a lock plate 2' as shown in FIG. 6. In FIG. 6, the reference numeral 22 indicates the same flat portion as that described above. In this case, the lock plates 2' can be laid out in a single plate in such a manner that the concave portion 21 of each of the lock plates 2' overlaps with the convex portion 23 of the adjacent lock plate 2', to maximize the number of the lock plates 2' to be obtained from the single plate so as to provide an enhanced process yield. In addition, the lock plate 2' to be typically supported on the opposite side of the concave portion 21 can assure an increased area of the support portion by utilizing the convex portion formed on the opposite side of the concave portion 21 of the lock plate 2'. Thus, the vertical swing of the lock plate 2' likely to be caused by a vertical force acting on the lock plate 2' can be suppressed to further reliably prevent the unintentional release of headrest lock.

Figure 7A:
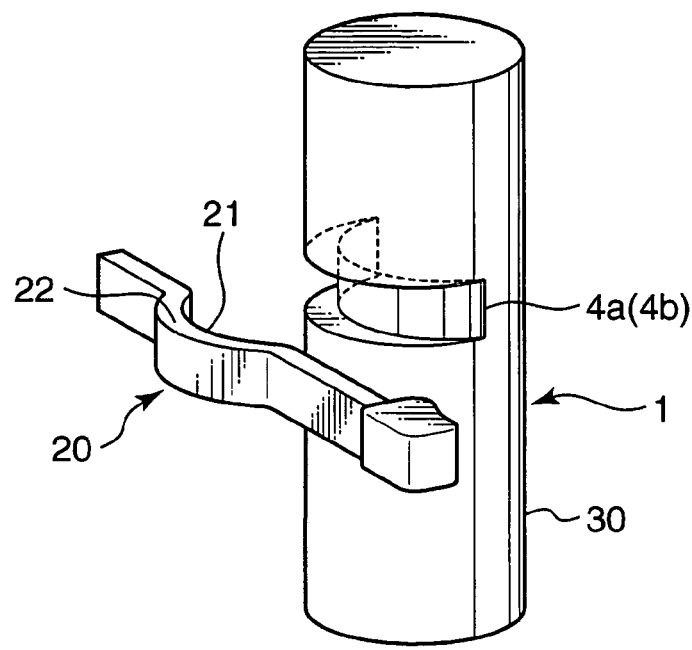
FIGS. 7A and 7B illustrates a headrest lock structure using a spring lock member, FIG. 7A being an exploded perspective view showing a spring lock member and a headrest pole, and FIG. 7B being a sectional view showing an engagement of the spring lock member onto the headrest pole.
Figure 7B:
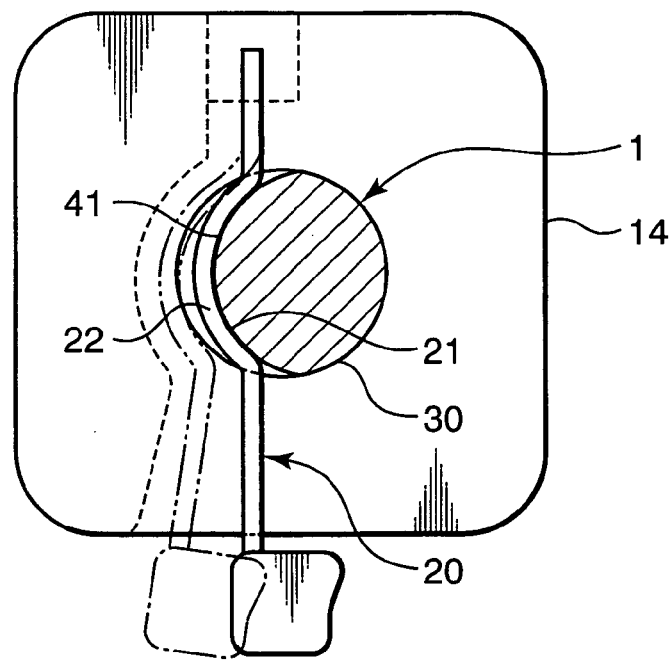
Figure 8A:
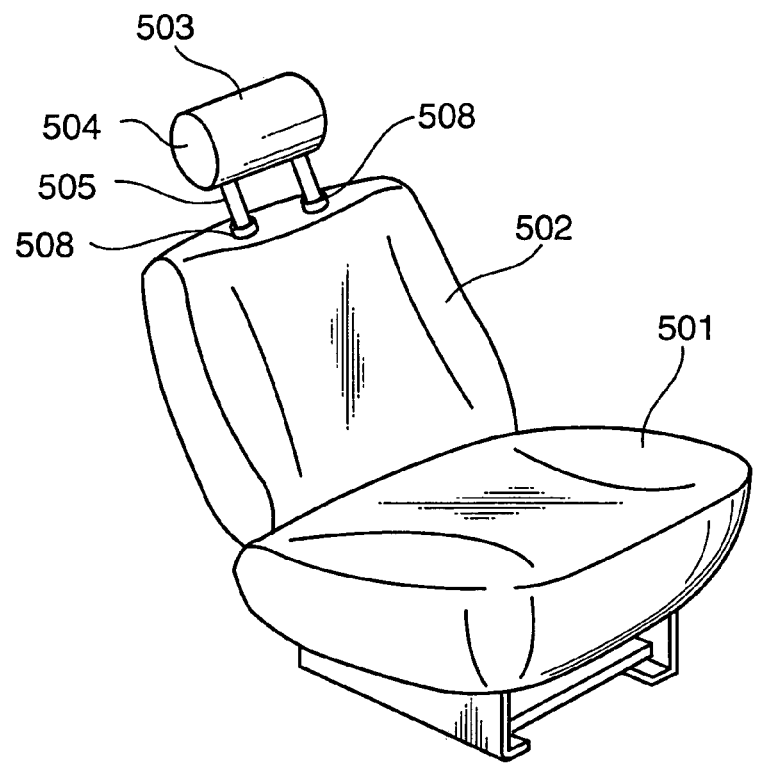
FIGS. 8A and 8B illustrates the structure of a conventional automobile seat.
Figure 8B:
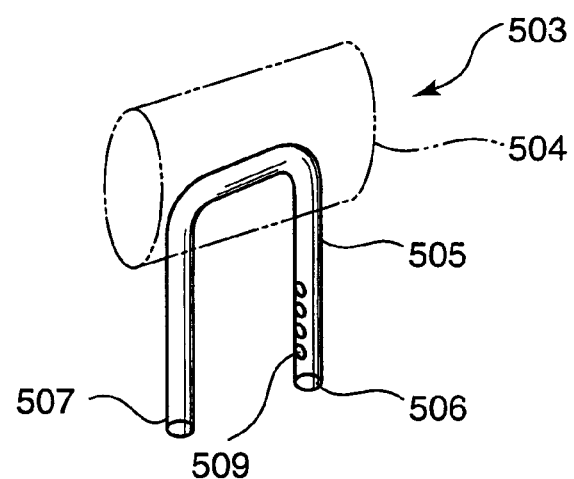
Figure 9A:
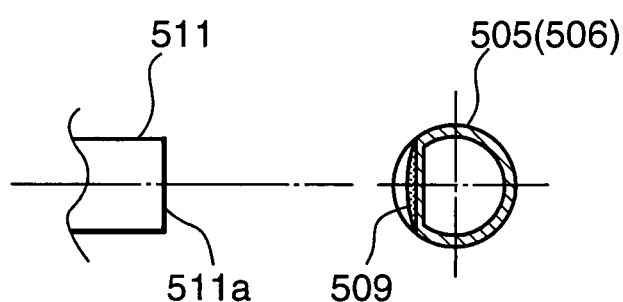
FIGS. 9A to 9D illustrate a conventional headrest lock structure.
Figure 9B:
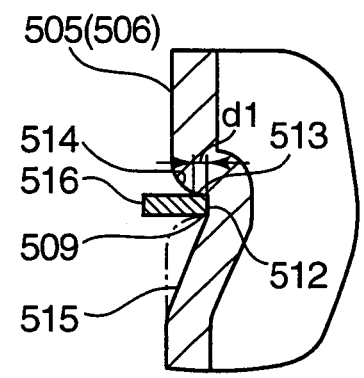
Figure 9C:
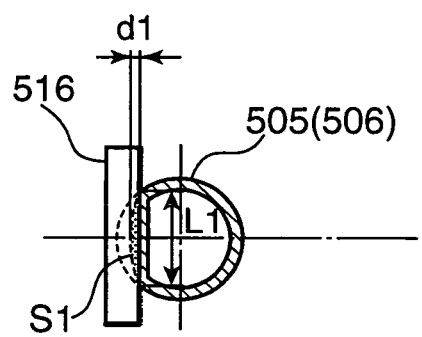
Figure 9D:
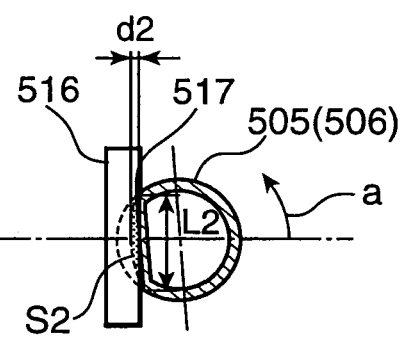

The lock member to be fitted into each of the lock slots 4 of the headrest pole 1 is not limited to the lock plate 2. For example, a spring member 20 as shown in FIGS. 7A and 7B may also be used as the lock member. The spring member 20 is a plate spring having a width fittable into each of the lock slots 4, and a longitudinally central portion formed as the concave portion 21. The spring member 20 has one end fixed to the pole guide 14 so as to be elastically deformed in a direction approximately perpendicular to the bottom surface 41 of each of the lock slots 4 to generate a restoring force allowing the central portion (concave portion 21) to be fitted into either one of the lock slots 4. The top surface of the central portion formed as the concave portion 21 serves as the aforementioned flat surface 22.

When the lock member is formed of a plate member or the like, it is required to additionally provide the spring 5 or the like for allowing the lock member to be fitted into either one of the lock slots 4. In contrast, according to this structure, such a function can be achieved only by the lock member, so as to provide a simplified structure while reducing the number of components.

The spring member 20 is not limited to the plate spring, but any other suitable spring, such as a round-bar-shaped spring without the flat portion 22, may be used.

While the bending process for the headrest pole 1 in the above embodiment is performed after the press-forming process, the bending process may be performed before the press-forming process in a reverse way. In this case, while the press-forming process involves some difficulties as mentioned above, the angular error to be caused by the bending process can be eliminated to provide further enhanced lock function.

Further, while the bending process in the above embodiment is designed to form the headrest pole 1 simply in a U shape, it may include an additional step of bending the U-shaped headrest pole 1 rearwardly by a given angle. Alternatively, the headrest pole 1 may be formed in any other suitable shape through a bending process. That is, the headrest pole of the present invention less subject to a bending process can be freely formed in any shape. Furthermore, while the headrest pole 1 in the above embodiment is subjected to the bending process to allow the lock slots 4 to be arranged in the right leg of the U-shaped headrest pole 1 and disposed on the inward side of the U shape, the headrest pole 1 may be bent to allow the lock slots 4 to be disposed on the outward side of the U shape, or may be bent to allow the lock slots 4 to be arranged in the left leg of the U-shaped headrest pole 1 and disposed on the inward or outward side of the U shape. Alternatively, the group of lock slots 4 may be formed in each of the right and left legs defining the U shape, and each of the groups may be disposed on the inward or outward side of the U shape. In either case, it is understood that the lock plate 2 is disposed at a position opposed to the lock slots 4.

While each of the lock slots 4 in the above embodiment is formed to extend over approximately one-half of the entire circumference of the pipe member to allow the area decrease rate of the engagement region S3 to be reliably reduced as long as the rotation angle of the headrest pole 1 is about 90 degrees or less, the length of each of the lock slots 4 may be less than one-half of the entire circumference if the rotation angle is small. Further, the concave portion 21 of the lock plate 2 in the above embodiment is designed to have a curvature radius r2 equal to the curvature radius r2 of the bottom surface 41 of each of the lock slots 4 so as to maximize the area of the engagement region S, it is not essential to set the respective curvature radii of the concave portion 21 and the bottom surface 41 at the same value, but the respective curvature radii may be set at approximately the same value to obtain an adequate effect. In the extreme case, the concave portion 21 of the lock plate 2 may be eliminated. Even in such a case, as long as the bottom surface 41 of each of the lock slots 4 in the headrest pole 1 is formed in an arc shape, the width d3 of the engagement region S3 in the rotated headrest pole 1 can be approximately equal to the maximum width "d" to assure a larger area of the engagement region than that in the conventional lock structure.

As described above, an inventive headrest lock structure comprises a plurality of lock slots formed in a cross-sectionally circular headrest pole in a line along the axial direction of the headrest pole, and a lock member adapted to be fitted into either one of the lock slots. In this headrest lock structure, each of the lock slots has a bottom surface protruding in an arc shape within a region concaved from the outer peripheral surface of the headrest pole by a given distance, and a side surface formed on at least one of the sides of the bottom surface in the axial direction of the headrest pole to extend outwardly from the bottom surface within the region at an approximately right angle with the bottom surface.

In the headrest lock structure of the present invention, each of the lock slots has a bottom surface protruding in an arc shape within a region concaved from the outer peripheral surface of the cross-sectionally circular headrest pole by a given distance, and a side surface formed on at least one of the sides of the bottom surface in the axial direction of the headrest pole to extend outwardly from the bottom surface within the region at an approximately right angle with the bottom surface. Thus, even if the headrest pole is attached in a displaced or mismatch position where it is rotated from its given correct position, due to an angular error of the headrest pole caused by a bending process thereof and/or production errors of the lock member, or due to an impact force applied to the headrest pole in a direction causing the rotation thereof, the width of an engagement region of the lock member to the headrest pole is kept at an approximately constant value before and after the rotation, so that the area decrease rate of the engagement region (the decrease rate between the areas of the engagement region before and after the rotation) is reduced as compared with the conventional lock structure so as to prevent the headrest lock from being unintentionally released.

In the headrest lock structure, the headrest pole may be formed out of a pipe member, and the lock slots may be formed in the pipe member.

The above pipe member can be subjected, for example, to a press-forming process to form the lock slots therein so as to achieve the reduction in production cost while reliably preventing the unintentional release of headrest lock. The pipe member may also be subjected to a cutting process to form the lock slots therein.

Alternatively, the headrest pole may be formed out of a solid member, and the lock slots may be formed in the solid member.

The above solid member can be subjected to a cutting process to form the lock slots therein so as to eliminate the arc-shaped portion (sagging portion) to further reliably prevent the unintentional release of headrest lock.

In the headrest lock structure, the bottom surface of each of the lock slots may have a curvature radius greater than that of the outer peripheral surface of the headrest pole.

The above bottom surface can have a relatively gentle arc shape to assure the strength of each of the lock slots and reliably prevent the unintentional release of headrest lock.

In the headrest lock structure, each of the lock slots may be formed to extend over approximately one-half of the entire circumference of the headrest pole.

In this case, even if the headrest pole is rotated, the area decrease rate of the engagement region can be reliably reduced as long as the rotation angle of the headrest pole is about 90 degrees or less, to reliably prevent the unintentional release of headrest lock.

In the headrest lock structure, the lock member may be formed with a concave portion having an arc shape corresponding to the profile of the bottom surface.

This structure allows the engagement region between the headrest pole and the lock member to have an arc shape so as to provide an increased length or area of the engagement region to reliably prevent the unintentional release of headrest lock.

The above concave portion of the lock member may have a curvature radius equal to or slightly greater than that of the bottom surface of each of the lock slots.

This structure allows the area of the engagement region to be maximized so as to further reliably prevent the unintentional release of headrest lock.

Further, the above lock member may be formed with a convex portion having an arc shape corresponding to the shape of the concave portion on the opposite side of the concave portion.

This structure can further reliably prevent the unintentional release of headrest lock, and provide an enhanced yield in a process of cutting out a plurality of lock members from a plate. In addition, the lock member to be supported on the opposite side of the concave portion can assure an increased area of the support portion by utilizing the convex portion formed on the opposite side of the concave portion of the lock member. Thus, the vertical swing of the lock member likely to be caused by a vertical force acting on the lock member can be suppressed to further reliably prevent the unintentional release of headrest lock.

Furthermore, the above lock member may be formed of a plate member which has a flat portion corresponding to the side surface of each of the lock slots, and a notched portion serving as the concave portion.

In this case, the lock member can be produced only by forming a notch in a plate to achieve a reduced production cost.

Alternatively, the lock member may be a spring member having a longitudinally central portion formed as the concave portion. The spring member may be fixed on the side of one of the ends thereof so as to be elastically deformed in a direction approximately perpendicular to the bottom surface of each of the lock slots to generate a restoring force allowing the central portion to be fitted into either one of the lock slots.

When the lock member is formed of a plate member or the like, it is required to additionally provide a spring or the like for allowing the lock member to be fitted into either one of the lock slots. In contrast, according to this structure, such a function can be achieved only by the lock member, so as to provide a simplified structure while reducing the number of components.

An inventive method for forming a plurality of lock slots in a headrest pole in a line along the axial direction of the headrest pole comprises: preparing a pipe member as a material of the headrest pole, and a press assembly which has a plurality of arc-shaped concave portions corresponding to the respective bottom surfaces of the lock slots and a plurality of flat portions corresponding to the respective side surfaces of the lock slots; and pressing the press assembly onto the peripheral surface of the pipe member so as to form each of the bottom surfaces to protrude in an arc shape within a region concaved from the outer peripheral surface of the pipe member by a given distance, and simultaneously form each of the side surfaces on at least one of the sides of a corresponding one of the bottom surfaces in the axial direction of the pipe member to extend outwardly from the bottom surface within the region at an approximately right angle with the bottom surface.

Despite a low-cost production method using a pipe member as a material of the headrest pole, this method can form the lock slots capable of allowing the width of an engagement region of the lock member to the headrest pole to be kept at an approximately constant value before and after the rotation, even if the headrest pole is attached in a displaced or mismatch position where it is rotated from its given correct position, due to an angular error of the headrest pole caused by a bending process thereof and/or production errors of the lock member, or due to an impact force applied to the headrest pole in a direction causing the rotation thereof, so that the area decrease rate of the engagement region is reduced as compared with the conventional lock structure so as to prevent the headrest lock from being unintentionally released.

An inventive method for producing a headrest pole comprises the steps of: forming a lock slot in a pipe member or a solid member to allow the lock slot to have a bottom surface protruding in an arc shape within a region concaved from the outer peripheral surface of the pipe member or solid member by a given distance, and a side surface formed on at least one of the sides of the bottom surface in the axial direction of the pipe member or solid member to extend outwardly from the bottom surface within the region at an approximately right angle with the bottom surface; and then bending the pipe member or solid member to provide the headrest pole having a given shape.

In the above method, the lock slots are first formed in a pipe or solid member, and then the pipe or solid member is subjected to a bending process to produce a headrest pole. Thus, while a method of forming the lock slots after the bending process inevitably involves a time-consuming operation due to the obstructive curved portion of the pipe or solid member, this method allows the lock slots to be readily formed without such a time-consuming operation. In addition, each of the lock slots formed through this method has the bottom surface protruding in an arc shape within a region concaved from the outer peripheral surface of the pipe or solid member by a given distance, and the side surface formed on at least one of the sides of the bottom surface in the axial direction of the pipe or solid member to extend outwardly from the bottom surface within the region at an approximately right angle with the bottom surface. Thus, even if the pipe or solid member is subjected to a bending process after the formation of the lock slots in the above manner, the unintentional release of headrest lock can be reliably prevented.

This application is based on patent application Nos. 2003-357497 and 2004-193560 filed in Japan, the contents of which are hereby incorporated by references.

The above embodiment has been described in conjunction with a headrest lock structure to be incorporated in a seat back of an automobile seat. However, the present invention may be applied to a headrest lock structure to be incorporated in a reclining seat other than an automobile seat, and may be applied to a lock structure for a pole of a parasol or the like.

What is claimed is:

1. A headrest lock structure comprising:
    a plurality of lock slots formed in a cross-sectionally circular headrest pole in a line along the axial direction of the headrest pole; and
    a lock member adapted to be fitted into either one of the lock slots, wherein each of the lock slots has:
    a bottom surface protruding in an arc shape within a region concaved from the outer peripheral surface of the headrest pole by a given distance; and
    an upper side surface formed on at least one of the sides of the bottom surface in the axial direction of the headrest pole to extend outwardly from the bottom surface within the region at an approximately right angle with the bottom surface, wherein the bottom surface of each of the lock slots has a curvature radius greater than that of the outer peripheral surface of the headrest pole.

2. The headrest lock structure as defined in claim 1, wherein the headrest pole is formed out of a pipe member, and the lock slots are formed in the pipe member.

3. The headrest lock structure as defined in claim 1, wherein each of the lock slots is formed to extend over approximately one-half of the entire circumference of the headrest pole.

4. The headrest lock structure as defined in claim 3, wherein the lock member is formed with a concave portion having an arc shape corresponding to the profile of the bottom surface.

5. The headrest lock structure as defined in claim 4, wherein the concave portion of the lock member has a curvature radius equal to or slightly greater than that of the bottom surface of each of the lock slots.

6. The headrest lock structure as defined in claim 5, wherein the lock member is formed into the shape of a plate which has a flat portion corresponding to the upper side surface of each of the lock slots, and a notched portion serving as the concave portion.

7. The headrest lock structure as defined in claim 5, wherein the lock member is formed with a convex portion having an arc shape corresponding to the shape of the concave portion on the opposite side of the concave portion.

8. The headrest lock structure as defined in claim 7, wherein the lock member includes a spring member having a longitudinally central portion formed as the concave portion, the spring member being fixed on the side of one of the ends thereof so as to be elastically deformed in a direction approximately perpendicular to the bottom surface of each of the lock slots to generate a restoring force allowing the central portion to be fitted into either one of the lock slots.

9. The headrest lock structure as defined in claim 4, wherein the lock member is formed with a convex portion having an arc shape corresponding to the shape of the concave portion on the opposite side of the concave portion.

10. The headrest lock structure as defined in claim 4, wherein the lock member is formed of a plate member which has a flat portion corresponding to the upper side surface of each of the lock slots, and a notched portion serving as the concave portion.

11. The headrest lock structure as defined in claim 4, wherein the lock member includes a spring member having a longitudinally central portion formed as the concave portion, the spring member being fixed on the side of one of the ends thereof so as to be elastically deformed in a direction approximately perpendicular to the bottom surface of each of the lock slots to generate a restoring force allowing the central portion to be fitted into either one of the lock slots.

12. The headrest lock structure as defined in claim 1, wherein the headrest pole is formed out of a solid member, and the lock slots are formed in the solid member.

13. The headrest lock structure as defined in claim 12, wherein the bottom surface of each of the lock slots has a curvature radius greater than that of the outer peripheral surface of the headrest pole.

14. The headrest lock structure as defined in claim 13, wherein the lock member is formed with a concave portion having an arc shape corresponding to the profile of the bottom surface.

15. The headrest lock structure as defined in claim 1, wherein each of the lock slots is formed to extend over approximately one-half of the entire circumference of the headrest pole.

16. The headrest lock structure as defined in claim 1, wherein the lock member is formed with a concave portion having an arc shape corresponding to the profile of the bottom surface.

* * * * *